US011120160B2

(12) United States Patent
Ying et al.

(10) Patent No.: US 11,120,160 B2
(45) Date of Patent: Sep. 14, 2021

(54) DISTRIBUTED PERSONAL DATA STORAGE AND ENCRYPTED PERSONAL DATA SERVICE BASED ON SECURE COMPUTATION

(71) Applicant: ADVANCED NEW TECHNOLOGIES CO., LTD., Grand Cayman (KY)

(72) Inventors: Pengfei Ying, Hangzhou (CN); Shan Yin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/841,462

(22) Filed: Apr. 6, 2020

(65) Prior Publication Data
US 2020/0242270 A1    Jul. 30, 2020

Related U.S. Application Data

(63) Continuation of application No. PCT/CN2020/071239, filed on Jan. 9, 2020.

(30) Foreign Application Priority Data

May 31, 2019  (CN) .......................... 201910475649.1

(51) Int. Cl.
*G06F 21/62* (2013.01)
*G06F 21/78* (2013.01)
(Continued)

(52) U.S. Cl.
CPC ........ *G06F 21/6245* (2013.01); *G06F 21/602* (2013.01); *G06F 21/78* (2013.01); *H04L 9/085* (2013.01); *H04L 9/0825* (2013.01)

(58) Field of Classification Search
CPC ..... G06F 21/602; G06F 21/6245; G06F 21/78; H04L 9/0825; H04L 9/085
See application file for complete search history.

(56) References Cited

U.S. PATENT DOCUMENTS 7,707,433 B2   4/2010   Rice et al.
8,010,782 B2   8/2011   Kerschbaum
(Continued)

FOREIGN PATENT DOCUMENTS

CN    101599188 A    12/2009
CN    102088491 A    6/2011
(Continued)

OTHER PUBLICATIONS

Witten Opinion and International Search Report for PCT Application No. PCT/CN2020/071239 made available to public on Dec. 3, 2020.

(Continued)

*Primary Examiner* — Theodore C Parsons

(57) ABSTRACT

A method for protecting user privacy for a privacy protection application, includes: receiving a request for user data of a user from a third-party service; receiving, from the user, an authorization for the request for the user data; acquiring the user data from a plurality of different storage facilities; processing the acquired user data with a data model provided by the third party service, wherein the data model comprises a multi-party computation model configured to generate processed user data based on the user data stored at the plurality of different storage facilities; encrypting the processed user data using a third-party public key associated with the third-party service; and transmitting the encrypted processed user data to the third-party service to enable the third-party service to decrypt the encrypted processed user data to obtain the processed user data.

20 Claims, 11 Drawing Sheets

(51) Int. Cl.
  *H04L 9/08*   (2006.01)
  *G06F 21/60*  (2013.01)

(56) References Cited

U.S. PATENT DOCUMENTS

| | | |
|---|---|---|
| 8,249,250 B2 | 8/2012 | Rane et al. |
| 8,301,883 B2 | 10/2012 | Sundaram et al. |
| 8,473,537 B2 | 6/2013 | Rane et al. |
| 8,515,058 B1 | 8/2013 | Gentry |
| 8,700,906 B2 | 4/2014 | Kamara et al. |
| 8,837,715 B2 | 9/2014 | Pastoriza et al. |
| 8,850,203 B2 | 9/2014 | Sundaram et al. |
| 9,077,539 B2 | 7/2015 | Kamara et al. |
| 9,252,942 B2 | 2/2016 | Zhang et al. |
| 9,521,124 B2 | 12/2016 | Raykova et al. |
| 9,967,088 B2 | 5/2018 | Ateniese et al. |
| 9,977,991 B2 | 5/2018 | Chu et al. |
| 10,050,785 B2 | 8/2018 | Tuyls et al. |
| 10,333,696 B2 | 6/2019 | Ahmed |
| 10,396,984 B2 | 8/2019 | French et al. |
| 10,445,698 B2 | 10/2019 | Hunn |
| 2003/0088520 A1* | 5/2003 | Bohrer ............ G06Q 10/10 705/74 |
| 2012/0131075 A1* | 5/2012 | Mawdsley ........ G06F 21/6254 707/825 |
| 2014/0140514 A1 | 5/2014 | Gentry |
| 2015/0295935 A1 | 10/2015 | Foerster et al. |
| 2016/0110500 A1 | 4/2016 | Wang et al. |
| 2016/0164676 A1 | 6/2016 | Gentry et al. |
| 2016/0253521 A1* | 9/2016 | Esmailzadeh ......... H04L 63/10 726/4 |
| 2018/0048628 A1 | 2/2018 | Soon-Shiong et al. |
| 2018/0182036 A1 | 6/2018 | Thorpe et al. |
| 2019/0028766 A1* | 1/2019 | Wold ............... H04N 21/4627 |
| 2019/0042788 A1 | 2/2019 | Cho et al. |
| 2020/0226284 A1* | 7/2020 | Yin ..................... G06F 21/6254 |

FOREIGN PATENT DOCUMENTS

| | | |
|---|---|---|
| CN | 102143188 A | 8/2011 |
| CN | 103957109 A | 7/2014 |
| CN | 104412561 A | 3/2015 |
| CN | 105072255 A | 11/2015 |
| CN | 105553940 A | 5/2016 |
| CN | 106027552 A | 10/2016 |
| CN | 107979595 A | 5/2018 |
| CN | 108573168 A | 9/2018 |
| CN | 110210246 A | 9/2019 |
| WO | 2019027787 A1 | 2/2019 |

OTHER PUBLICATIONS

First Search for Chinese Application No. 201910475649.1 dated May 8, 2021 (1 page).

First Office Action for Chinese Application No. 201910475649.1 dated May 12, 2021 (18 page).

* cited by examiner

DISTRIBUTED PERSONAL DATA STORAGE AND ENCRYPTED PERSONAL DATA SERVICE BASED ON SECURE COMPUTATION

CROSS REFERENCE TO RELATED APPLICATIONS

This application is a continuation application of International Application No. PCT/CN2020/071239, filed on Jan. 9, 2020, which claims priority to and benefits of Chinese Patent Application No. 201910475649.1 filed on May 31, 2019. The contents of the above-referenced applications are incorporated herein by reference in their entirety.

TECHNICAL FILED

This specification relates to protection and processing of privacy data, and in particular, to a method and system for a personal data service based on secure computation.

BACKGROUND

More and more Internet applications are involved in people's daily lives. Particularly, the development of mobile Internet forms a nationwide trend in which all people can surf on Internet. The daily habits of people are changing. For example, people are getting used to the convenience of handling various daily affairs via networks, such as shopping, paying fees, making payments, and the like. Therefore, in the Internet era, the protection of user privacy information becomes extremely important.

At present, the demand for protecting sensitive user data, such as identification numbers, photos on identification documents, and financial data, is constantly increasing, no matter where such data is located. Nowadays, a merchant or an enterprise may perform big data analysis on collected user data to recommend advertisements, and even resell user privacy data to a third party, thus causing adverse consequences, such as a user receiving harassing calls.

In addition, user privacy data is generally stored in a server of an enterprise or a merchant. However, most enterprises are not professional IT companies, and the security protection levels of their servers are usually low, which may allow an individual hacker to conduct malicious attach and steal the user privacy data. In light of dire legal liabilities and negative reports that enterprise victims suffer in a series of well-known and costly data stolen cases, protection measures and means against those attacks are quickly becoming mature and advanced. However, the hackers are also pressing ahead.

The embodiments of this specification are made with the purpose of solving these technical problems. Although relatively specific problems are discussed, it should be understood that the embodiments should not be limited merely to solve the specific problems proposed in the background.

SUMMARY

This specification will be introduced in a concise form, and some concepts will be further described in the following detailed description. This specification does not intend to identify key features or essential features of the claimed subject matter, nor does the specification facilitates in determining the scope of the claimed subject matter.

To deal with the privacy protection issue regarding user information or user data in the art, this specification provides a user privacy protection solution. The technical solution aims to overcome the drawbacks in the current technologies in which user privacy data is mostly stored in a server of a merchant or an enterprise.

Generally, in one solution of this specification, a user installs a privacy protection application (App) in a local client for managing personal data or personal information; and the user, by using the privacy protection application, stores personal data or personal information in a cloud storage associated with the application or in another cloud storage specified by the user, rather than in a server associated with a third party merchant or enterprise. The user is given an absolute control over the personal information or personal data in the cloud storage, i.e., the user can add, search for, modify, and delete any personal information or data. The user can encrypt the personal data stored in the cloud storage, so as to prevent any unauthorized use or sharing.

When a third party merchant or an enterprise requests for user data, the user can authorize, using a password or a cipher code, the third party merchant or the enterprise to search for the personal information or personal data stored in the cloud storage. The user can also authorize the privacy protection application installed on the client to acquire corresponding user data from the cloud storage. The acquired user data can be encrypted. The privacy protection application decrypts the acquired user data based on the user's authorization, and stores the decrypted user data in an internal storage of a user device, rather than caches the user data. Subsequently, the privacy protection application uses a public key provided by the third party merchant to encrypt the user data stored in the internal storage, and transmits the encrypted user data to the third party merchant. The third-party merchant receives the encrypted user data and uses a private key for decryption so as to acquire the user data or information.

Therefore, compared with the current technologies, the present solution allows the user to have absolute control over the personal information or personal data; and the third-party merchant cannot unscrupulously gather user data for commercial purposes, thereby avoiding various privacy breach.

This specification further provides an advanced solution for protecting user privacy. In the technical solution, in addition to the advantage that the user is given the absolute control over the personal information or personal data, the user data is further processed by using a data model or a rule provided by the third party merchant, to generate the processed user data before the encrypted user data is transmitted to the third party merchant. The third party merchant thus cannot acquire detailed user data after decryption, and can only use the user data on the basis of the provided model or rule. User privacy is thus further protected.

In one aspect of this specification, a method for protecting privacy data is provided. The method comprises: receiving a request for the user data of a user from a third-party service; receiving, from the user, an authorization for the request for the user data; acquiring the user data from a cloud storage; encrypting the acquired user data using a third-party public key associated with the third-party service; and transmitting the encrypted user data to the third-party service for decrypting the encrypted user data to obtain the user data.

In another aspect of this specification, a system for protecting privacy data is provided. The system comprises: an apparatus configured to receive a request for user data of a user from a third-party service; an apparatus configured to receive, from the user, an authorization for the request for the user data; an apparatus configured to acquire the user data from a cloud storage; an apparatus configured to encrypt the acquired user data using a third-party public key associated with the third-party service; and an apparatus configured to transmit the encrypted user data to the third-party service for decrypting the encrypted user data to obtain the user data.

In another aspect of this specification, another method for protecting privacy data is provided. The method comprises: receiving a request for user data of a user from a third-party service; receiving, from the user, an authorization for the request for the user data; acquiring the user data from a cloud storage; processing the acquired user data using a data model or a rule provided by the third-party service; encrypting the processed user data using a third-party public key associated with the third-party service; and transmitting the encrypted processed user data to the third-party service for decrypting the encrypted processed user data to obtain the processed user data.

In another aspect of this specification, another system for protecting privacy data is provided. The system comprises: an apparatus configured to receive a request for user data of a user from a third-party service; an apparatus configured to receive, from the user, an authorization for the request for the user data; an apparatus configured to acquire the user data from a cloud storage; an apparatus configured to process the acquired user data using a data model, or a rule provided by the third-party service; an apparatus configured to encrypt the processed user data using a third-party public key associated with the third-party service; and an apparatus configured to transmit the encrypted processed user data to the third-party service for decrypting the encrypted processed user data to obtain the processed user data.

In another aspect of this specification, a method for protecting user privacy for a privacy protection application is provided. The method includes: receiving a request for user data of a user from a third-party service; receiving, from the user, an authorization for the request for the user data; acquiring the user data; processing the acquired user data with a data model provided by the third party service, wherein the data model comprises a multi-party computation model configured to generate processed user data based on the user data stored at a plurality of different storage facilities; encrypting the processed user data using a third-party public key associated with the third-party service; and transmitting the encrypted processed user data to the third-party service to enable the third-party service to decrypt the encrypted processed user data to obtain the processed user data.

In another aspect of this specification, an apparatus is provided. The apparatus includes at least one processor and a memory communicatively connected to the at least one processor. The memory stores instructions executable by the at least one processor to cause the at least one processor to perform operations including: receiving a request for user data of a user from a third-party service; receiving, from the user, an authorization for the request for the user data; acquiring the user data; processing the acquired user data with a data model provided by the third party service, wherein the data model comprises a multi-party computation model configured to generate processed user data based on the user data stored at a plurality of different storage facilities; encrypting the processed user data using a third-party public key associated with the third-party service; and transmitting the encrypted processed user data to the third-party service to enable the third-party service to decrypt the encrypted processed user data to obtain the processed user data.

In another aspect of this specification, a non-transitory computer-readable storage medium is provided. The non-transitory computer-readable storage medium stores instructions executable by at least one processor to cause the at least one processor to perform operations including: receiving a request for user data of a user from a third-party service; receiving, from the user, an authorization for the request for the user data; acquiring the user data; processing the acquired user data with a data model provided by the third party service, wherein the data model comprises a multi-party computation model configured to generate processed user data based on the user data stored at a plurality of different storage facilities; encrypting the processed user data using a third-party public key associated with the third-party service; and transmitting the encrypted processed user data to the third-party service to enable the third-party service to decrypt the encrypted processed user data to obtain the processed user data.

Each aspect of this specification generally comprises a method, apparatus, system, and computer program product as basically described in this description with reference to the accompanying drawings.

After the description of the specific exemplary embodiments of this specification hereafter is studied in combination with the accompanying drawings, the other aspects, features, and embodiments of this specification would be obvious for those skilled in the art. Although the features of this specification may be discussed hereafter with reference to certain embodiments and accompanying drawings, all embodiments of this specification may comprise one or more advantageous features discussed herein. In other words, although it is discussed that one or more embodiments have certain advantageous features, one or more of such advantageous features can also be used according to the embodiments of this specification discussed herein. In a similar way, although exemplary embodiments are discussed hereafter as device, system or method embodiments, it should be appreciated that the exemplary embodiments can be implemented in various devices, systems, and methods.

BRIEF DESCRIPTION OF THE DRAWINGS

To facilitate a full understanding of the means used by the above-described features in this specification, the foregoing brief summary can be described in detail with reference to different aspects; and some aspects are illustrated in the accompanying drawings. However, it should be noted that the accompanying drawings illustrate only some typical aspects of this specification and should not be interpreted as limiting the scope of this specification since this description may allow other aspects having equivalent effects.

DETAILED DESCRIPTION OF EMBODIMENTS

The embodiments will be thoroughly described hereafter with reference to the accompanying drawings forming a part of this specification and showing specific exemplary embodiments. However, the embodiments can be implemented in various different forms and should not be interpreted as limiting the embodiments illustrated herein; conversely, the embodiments are provided to enable this specification to become explicit and complete such that those skilled in the art could fully understand the scopes of these embodiments. Each embodiment can be implemented as a method, a system, or a device. Therefore, the embodiments can be implemented in a hardware manner, in an all-software manner, or in a manner that combines both hardware and software. Thus, the following implementation manners are not limited.

Figure 1:
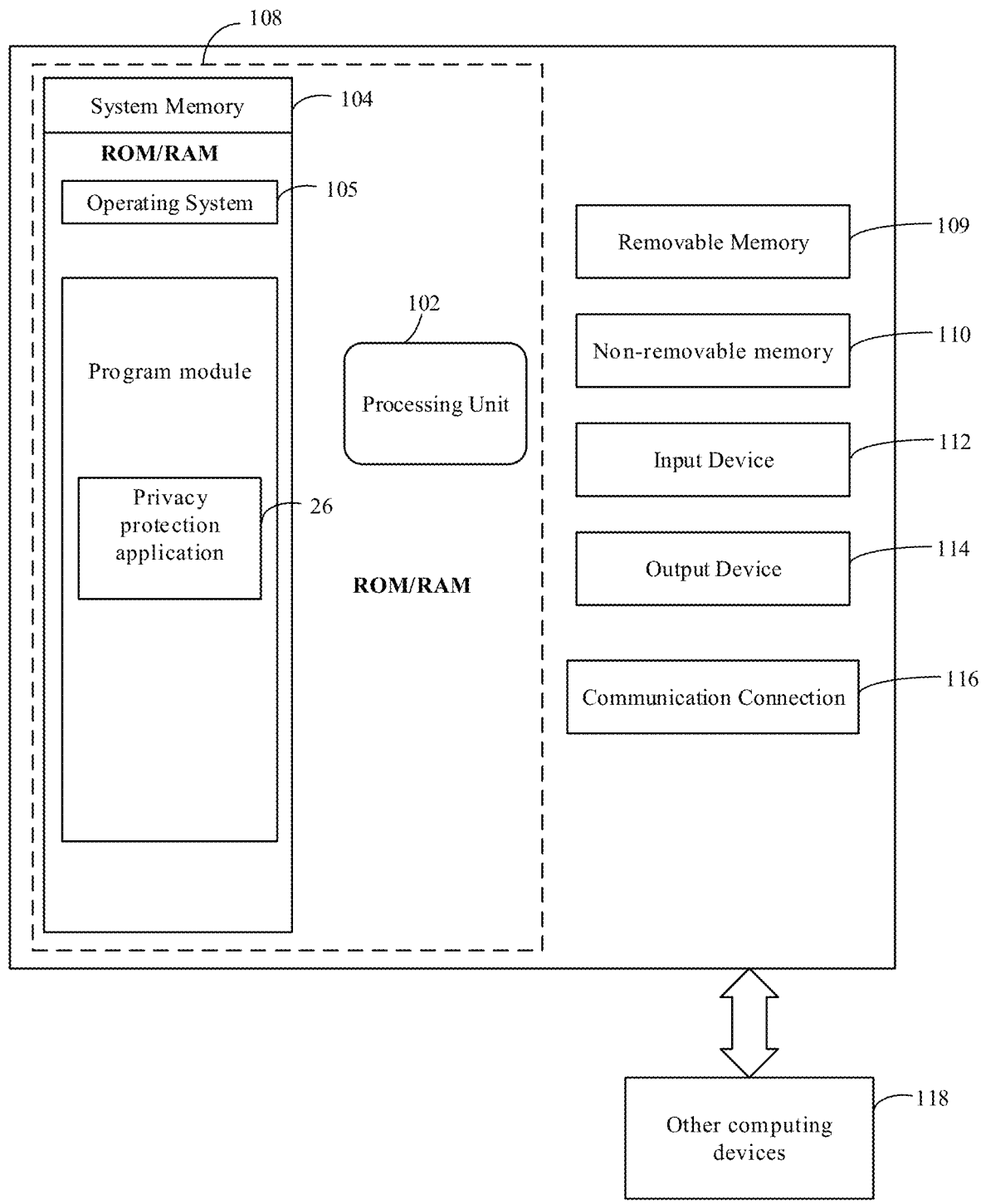
FIG. 1 is a block diagram of a computing device for implementing various embodiments of this specification.
Figure 2A:
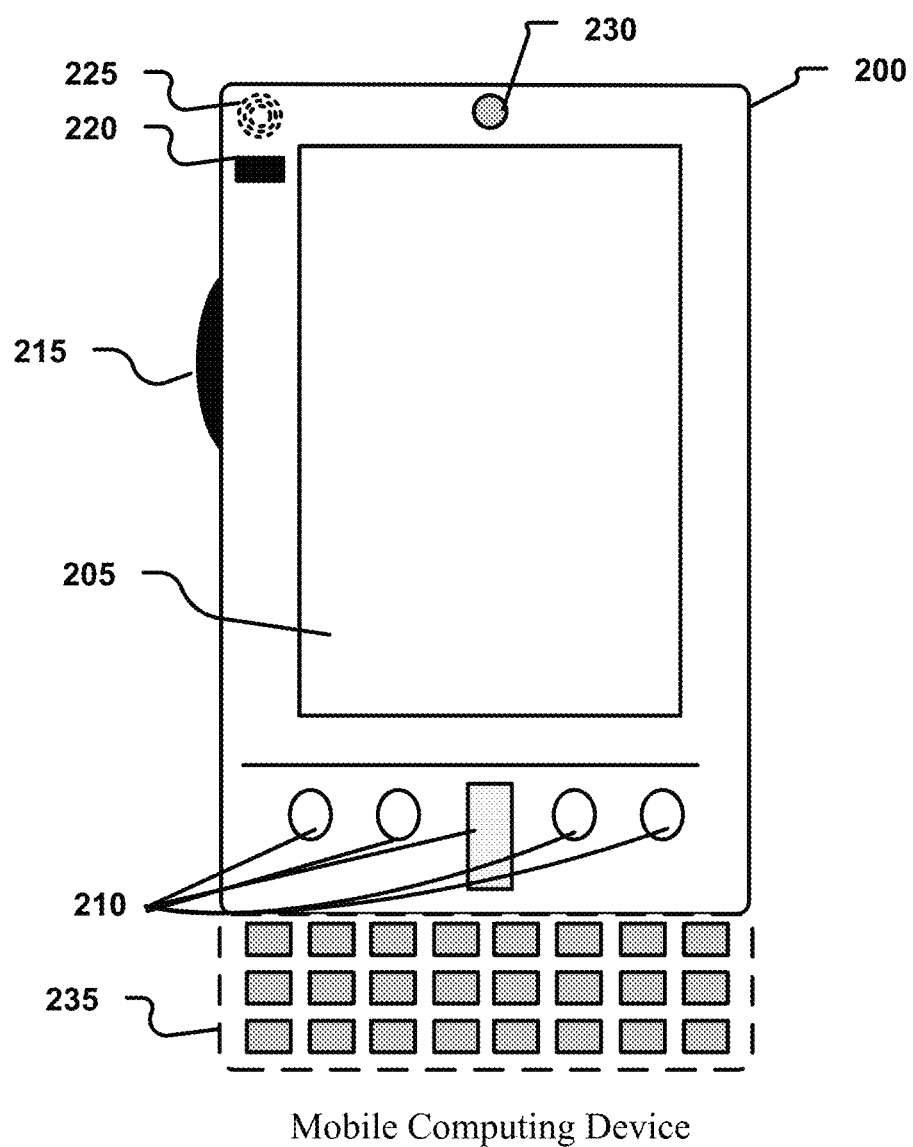
FIG. 2A illustrates an example mobile computing device for implementing various embodiments of this specification.
Figure 2B:
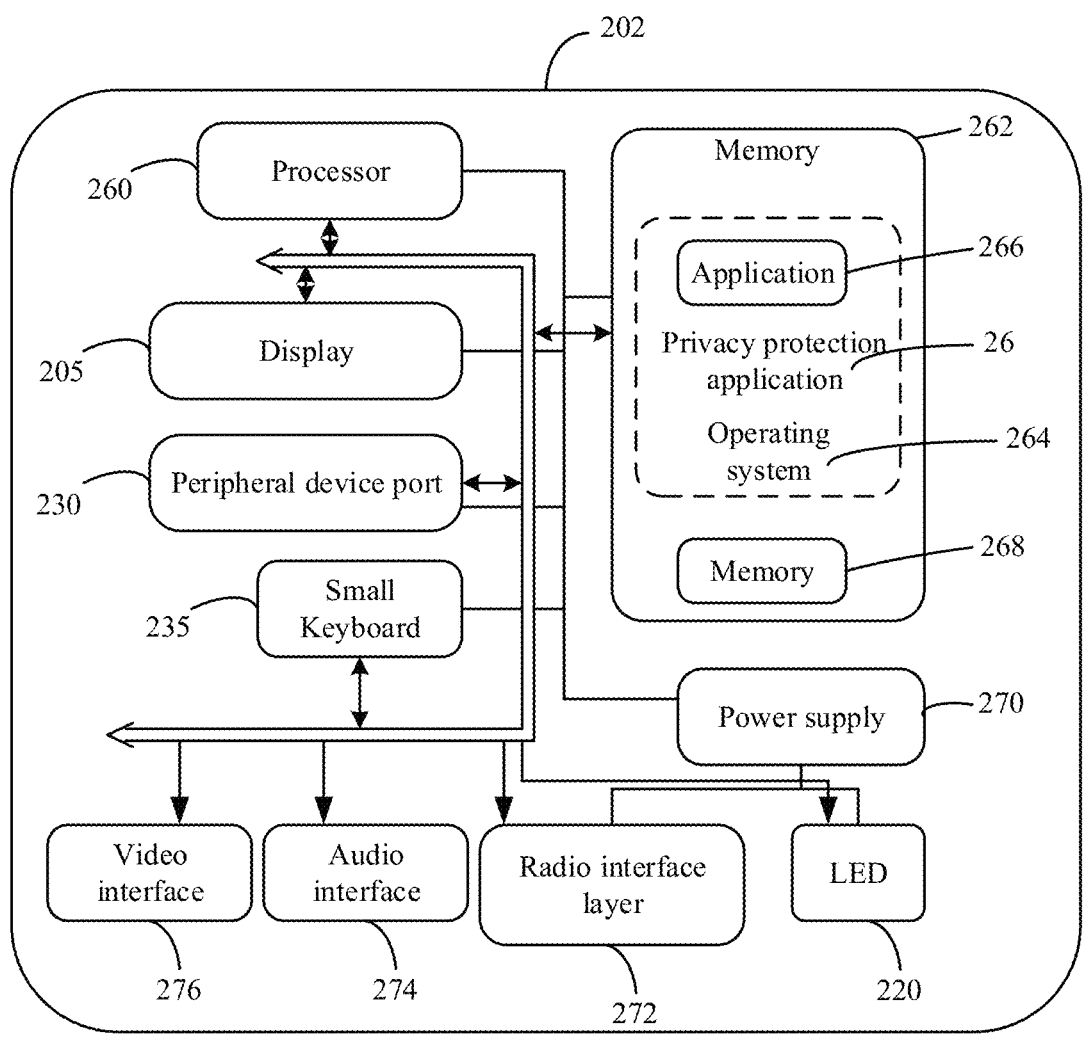
FIG. 2B is a block diagram showing an example mobile computing device for implementing various embodiments of this specification.
Figure 3:
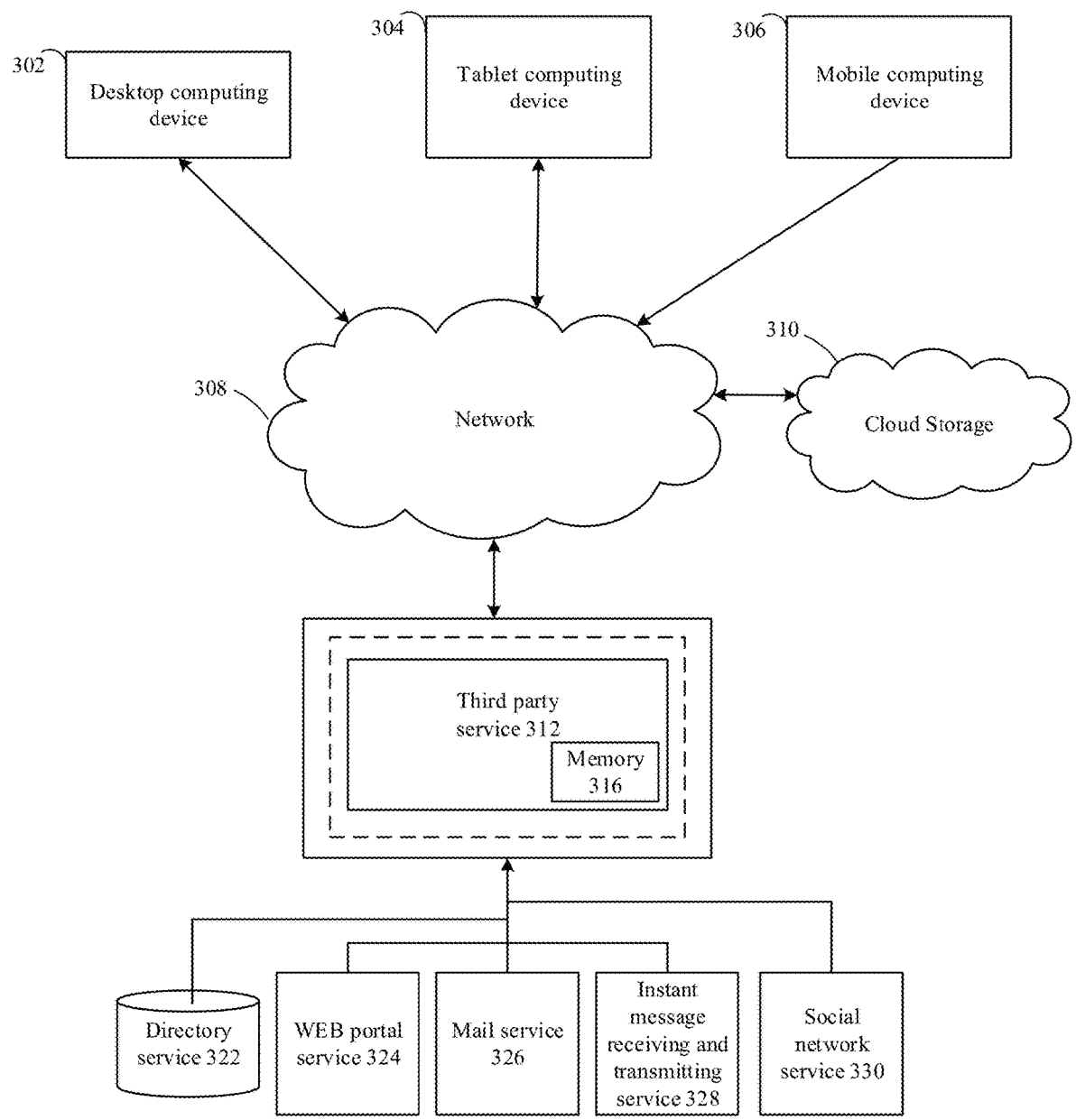
FIG. 3 shows a network environment in which embodiments of this specification can be implemented.

FIGS. 1, 2A, 2B, and 3 as well as relevant descriptions provide a discussion about various operating environments in which the embodiments of this specification can be implemented. However, the devices and systems shown and discussed in FIGS. 1-3 are used for the purposes of illustration and description only, rather than imposing a limitation on a large number of computing device configurations which can be used to implement the embodiments of this specification described herein.

FIG. 1 is a block diagram of a computing device 100 for implementing various embodiments of this specification. The computing device components described below are applicable to the above-described computing device. In a basic configuration, the desktop computing device 100 may comprise at least one processing unit 102 and a system memory 104. Depending on a configuration and type of the computing device, the system memory 104 may include, but is not limited to, a volatile memory (for example, a random access memory (RAM)), a non-volatile memory (for example, a read-only memory (ROM)), a flash memory, or any combination. The system memory 104 can comprise an operating system 105, one or a plurality of programming modules 106, and can further comprise a web browser application 120. For example, the operating system 105 can be configured to control operations of the desktop computing device 100. In one embodiment, the programming module 106 can comprise a privacy protection application 26 installed on the desktop computing device 100. In addition, embodiments of this specification can be implemented by combining a graphics library, other operating systems, or any other application programs, rather than being limited to any specific application programs or systems. The basic configuration is shown by those components within a dotted line 108 in FIG. 1.

The desktop computing device 100 can have additional features or functions. For example, the desktop computing device 100 can further comprise additional data storage devices (removable and/or non-removable), such as a magnetic disk, a compact disk, or a magnetic tape. The additional storage devices are shown by a removable memory 109 and a non-removable memory 110.

As described above, data files and a plurality of program modules including the operating system 105 can be stored in the system memory 104. When executed by the processing unit 102, the program module 106 can execute various processes, including operations related to the method described below. The following process is an example, and the processing unit 102 can execute other processes. Other program modules which can be used according to the embodiments of this specification may comprise an e-mail and contacts application, a word processing application, an electronic spreadsheet application, a database application, a presentation application, a drawing or computer-aided application program and so on.

Generally speaking, the program modules according to the embodiments of this specification can comprise routines, programs, components, data structures, or other types of structures which can execute a specific task or can implement a specific abstract data type. In addition, embodiments of this specification can be implemented by using other computer system configurations, including handheld devices, multi-processor systems, microprocessor-based systems, or programmable consumer electronic products, minicomputers, large-scale computers, and so on. The implementation manners of this specification can also be done in a distributed computation environment in which a task is executed by a remote processing device linked via a communication network. In the distributed computation environment, the program modules can be located in both a local storage device and a remote storage device.

In addition, the implementation manners of this specification can be done on a circuit including discrete electronic elements, an encapsulated or integrated electronic chip including a logic gate, a circuit utilizing a microprocessor, or a single chip including electronic elements or a microprocessor. For example, embodiments of this specification can be implemented via a system on chip (SOC), where one or more components shown in FIG. 1 can be integrated on a single integrated circuit. Such SOC device can comprise one or a plurality of processing units, graphic units, communication units, system virtualization units, and various application functions which are all integrated (or "burned") onto a chip substrate as a single integrated circuit. When operated via the SOC device, the functions of a manager 26 described herein can be operated via an application specific logic integrated, together with the other components of the computing device/system 100, on a single integrated circuit (chip). The implementation manners of this specification can also be performed by using other technologies capable of executing logic operations such as AND, OR, NOT, and so on, including, but not limited to, mechanical, optical, fluid, and quantum technologies. In addition, the implementation manners of this specification can be done in a general computer or in any other circuit or system.

For example, the implementation manners of this specification can be done as a computer process (method), a computing system, or a product such as a computer program product or a computer readable medium. The computer program product can be a readable computer storage medium of a computer system which encodes a computer program for executing a computer process instruction.

The term "computer readable medium" used herein can comprise a computer storage medium. Computer storage media may include volatile and nonvolatile, removable and non-removable media implemented in any method or technology for storage of information such as computer readable instructions, data structures, program modules or other data. The system memory 104, the removable memory 109 and the non-removable memory 110 are all examples of the computer storage medium (i.e., a memory storage device). The computer storage medium can include, but is not limited to, a RAM, an ROM, an electrically-erasable programmable read-only memory (EEPROM), a flash memory or any other memory, a CD-ROM, a digital video disk (DVD) or any other optical memory, a cassette, a magnetic tape, a magnetic disk memory or any other magnetic storage device, or any other medium which can store information and can be accessed by the desktop computing device 100. Any type of such computer storage medium can be a part of the device 100. The desktop computing device 100 may further comprise an input device 112, such as a keyboard, a mouse, a pen, a voice input device, and a touch input device, and may further comprise an output device 114, such as a display, a speaker, and a printer. The above-described devices are examples, and other devices can also be used.

A camera and/or any other sensing device can be operated to record one or a plurality of users and to capture an action and/or posture conducted by a user of the computing device. The sensing device can also be operated to capture a word spoken through a microphone, and/or other information inputted from the user via a keyboard and/or a mouse (not shown in the figure). The sensing device can comprise any motion detection device capable of detecting a motion of the user.

The term "computer readable medium" used herein further comprises a communication medium. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

FIGS. 2A and 2B show an appropriate mobile computation environment in which the embodiments of this specification can be implemented, for example, a mobile phone, a smart phone, an input board personal computer, a laptop computer, and the like. With reference to FIG. 2A, an exemplary mobile computing device 200 for implementing the embodiments is illustrated. In a basic configuration, the mobile computing device 200 is a hand-held computer provided with both an input element and an output element. The input element can comprise a touch screen display 205 and input buttons 210 allowing a user to input information into the mobile computing device 200. The mobile computing device 200 can be integrated with an optional side input element 215 allowing further user input. The optional side input element 215 can be a turn switch, a button, or any other types of manual input element. In an alternative embodiment, the mobile computing device 200 can be integrated with more or fewer input elements. For example, in some embodiments, the display 205 may not be a touch screen display. In still another alternative embodiment, the mobile computing device is a portable telephone system, such as a cellular phone having a display 205 and input buttons 210. The mobile computing device 200 can further comprise an optional small keyboard 235. The optional small keyboard 235 can be a physical small keyboard, or a "soft" small keyboard formed on the touch screen display.

The mobile computing device 200 may be integrated with an output element, such as the display 205 capable of displaying a graphical user interface (GUI). Other output elements include a speaker 225 and an LED 220. In addition, the mobile computing device 200 may comprise a vibration module (not shown in the figure), wherein the vibration module is configured to make the mobile computing device 200 vibrate to notify the user of an event. In still another embodiment, the mobile computing device 200 may be integrated with a headphone jack (not shown in the figure) for providing another means used to provide an output signal.

Although this specification is described herein in combination with the mobile computing device 200, in alternative embodiments, this specification can further be used in combination with any number of computer systems, such as in a desktop computer environment, a laptop or notebook computer system, a multi-processor system, a microprocessor-based system or a programmable consumer electronic product, a network PC, a minicomputer and a large-scale computer. The embodiments of this specification can also be implemented in a distributed computation environment, wherein a task is executed by a remote processing device linked via a communication network in the distributed computation environment; and a program can be located in both a local storage device and a remote storage device. In short, the embodiments of this specification can be integrated with any computer systems having a plurality of environment sensors, a plurality of output elements for providing notification to the user, and a plurality of notification event types.

FIG. 2B shows a component block diagram of a mobile computing device, such as the computing device shown in FIG. 2A, used in one embodiment. That is, the mobile computing device 200 can be integrated with a system 202 to implement certain embodiments. For example, the system 202 can be configured to implement a "smart phone" that runs one or a plurality of applications similar to those of a desktop or notebook computer application; and the applications can be, for example, a presentation application, a browser application, an e-mail application, a program scheduling application, an instant message receiving and transmitting application, and a media player application. In some embodiments, the system 202 is integrated to be a computing device, such as an integrated personal digital assistant (PDA) and a radio telephone.

One or a plurality of applications 266 can be loaded into a memory 262 and can operate on an operating system 264 or operate in association with the operating system 264. Examples of the application programs include a phone dialer program, an e-mail program, a personal information management (PIM) program, a word processing program, an electronic spreadsheet program, an Internet browser program, a message communication program, and the like. The system 202 further comprises a non-volatile memory 262 in a memory 268. The non-volatile memory 268 can be configured to store permanent information that will not be lost when the system 202 is powered off. The application 266 can use information and store the information in the non-volatile memory 268, such as an e-mail or other messages used by an e-mail application. A synchronization application (not shown in the figure) can also reside on the system 202, and is programmed to interact with a corresponding synchronization application residing on a host computer, such that information stored in the non-volatile memory 268 can be synchronized with corresponding information stored in the host computer. It should be understood that other applications can be loaded into the memory 262 and can operate on the device 200, including the privacy protection application 26.

The system 202 is provided with a power supply 270 which can be implemented as one or a plurality of batteries. The power supply 270 may further comprise an external power source, for example, a boosting battery, an AC adapter for recharging the battery, or a powered docking cradle.

The system 202 may further comprise a radio 272 for executing the functions of transmitting and receiving radio frequency communication. The radio 272 facilitates a wireless connection between the system 202 and the "external world" via a communication operator or a service provider. The transmission from/to the radio 272 is performed under the control of the operating system 264. In other words, communications received by the radio 272 can be forwarded to the application 266 via the operating system 264, and vice versa.

The radio 272 allows the system 202 to communicate with other computing devices via, for example, a network. The radio 272 is an example of the communication medium. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term "computer readable medium" used herein comprises both a storage medium and a communication medium.

The embodiment of the system 202 is shown by two types of notification output devices: an LED 220 configured to provide a visual notification and an audio interface 274 used for the speaker 225 and configured to provide an audio notification. These devices may be directly coupled to the power supply 270, such that when the devices are activated, even though a processor 260 and other components may be switched off to save battery power, the components can still maintain to be powered on in a duration specified by a notification mechanism. The LED 220 can be programmed to be infinitely powered on, until the user takes action and indicates a power on-off state of the device. The audio interface 274 is configured to provide an auditory signal for the user and receive an aural signal from the user. For example, in addition to being coupled to the speaker 225, the audio interface 274 can also be coupled to a microphone to receive an auditory input, thus facilitating a telephone conversion and so on. According to the embodiments of this specification, the microphone can also act as an audio sensor to facilitate control of notifications, as described below. The system 202 may further comprise a video interface 276 allowing an on-board camera 230 to record a still image, a video stream and the like.

The mobile computing device enables the system 202 to have additional features or functions. For example, the device can further comprise additional data storage devices (removable and/or non-removable), such as a magnetic disk, a compact disk, or a magnetic tape. Such additional storage devices are shown as the memory 268 in FIG. 2B. Computer storage media may include volatile and nonvolatile, removable and non-removable media implemented in any method or technology for storage of information such as computer readable instructions, data structures, program modules or other data.

The data/information generated or captured by the device 200 and stored by the system 202 can be locally stored in the device 200 as described above, or stored in any number of storage media accessible by the device via the radio 272 or via a wired connection between the device 200 and a separate computing device associated with the device 200, wherein the separate computing device is, for example, a server computer in a distributed computation network such as the Internet. It should be understood that such data/information can be accessed via the device 200, the radio 272 or the distributed computing network. Similarly, the data/information can be easily transmitted between computing devices for storage and use by using known data/information transmission and storage means; and the means comprise e-mails, and a collaborative data/information sharing system.

FIG. 3 shows a network environment in which the embodiments of this specification can be implemented. A third-party service 312 may include, but is not limited to, a directory service 322, a web portal service 324, a mail service 326, an instant message receiving and transmitting service 328, and a social network service 330. A server 332 can provide communications and services related to the method described herein. The third-party service 312 can communicate with computing devices on the web via the server 332 and a network 308. The computing devices that can use the server 332 comprise, for example, a desktop computing device 302 (the desktop computing device can comprise any general personal computer), a tablet computing device 304, and/or a mobile computing device 306 which may comprise a smart phone. Each computing device, specifically the privacy protection application in the computing devices, can acquire user information from a cloud storage 310 under the authorization of the user, then encrypt and transmit the user information to the third-party service 312. The third-party service 312 decrypts the received encrypted user information and stores the information in a memory 316.

Figure 4:
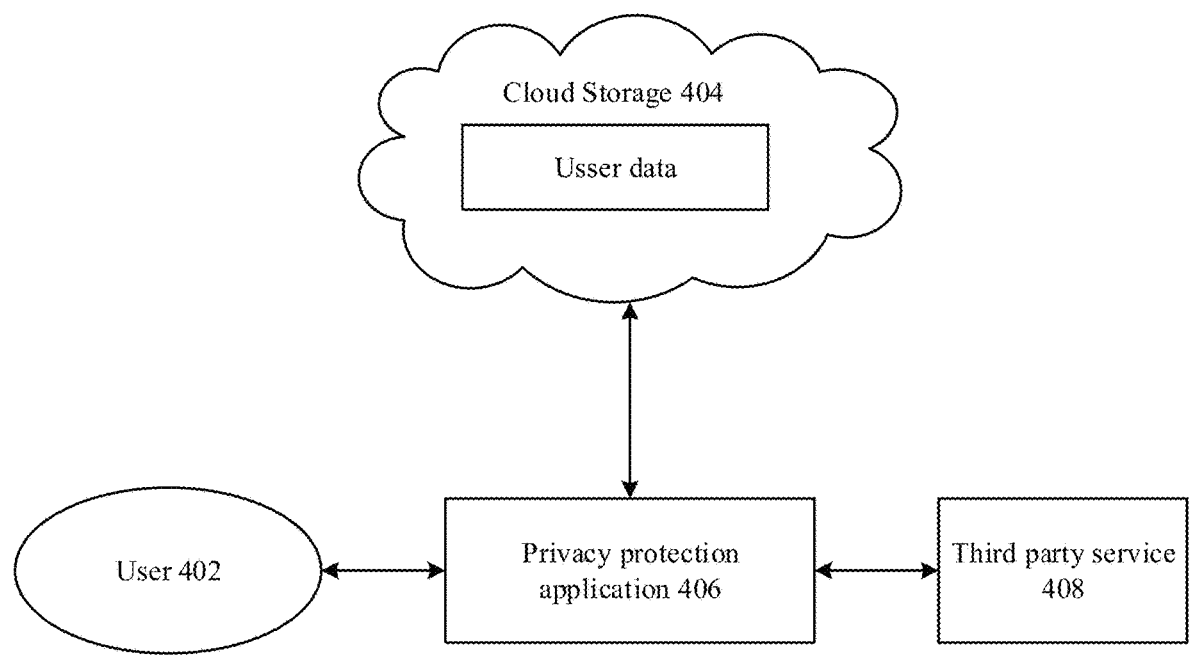
FIG. 4 shows a block diagram of an example system for protecting user privacy data according to one embodiment of this specification.

FIG. 4 shows a block diagram of an example system for protecting user privacy data according to one embodiment of this specification. In the example, a user 402 installs a privacy protection application (App) 406 in a local client for managing personal data or personal information. The "client" described herein may refer to a personal computing device of a user, including a computing device (such as a desktop computer, a laptop computer, and a smart television), a tablet computing device (such as an iPad), and a mobile computing device (such as a smart phone). The "privacy protection application" described herein may refer to an application downloaded by the user from various application stores and installed on the local client, including, but not limited to, the Alipay developed by Ant Financial Cooperation and the like.

The privacy protection application 406 is configured to manage personal data of the user. In one example, the privacy protection application 406 is configured to receive a data request from a third party service, and forward the request to the user 402; receive an authorization or a permission of the user 402 for the request, and transmit authorization information or permission information to the third party service; and download the requested user data from a cloud storage on the basis of the authorization of the user and store the user data in an internal storage, rather than caching the data. Additionally or alternatively, the user data acquired by the privacy protection application 406 from the cloud storage 404 can be encrypted. The privacy protection application 406 can acquire the encrypted user data from the cloud storage when the user authorizes the download, restore the user data on the basis of the download authorization of the user, use a public key provided by the third party service to encrypt the user data in the internal storage, and transmit the encrypted user data to the third party service for the third party service to decrypt the encrypted user data and use the user data.

The user 402 uses the privacy protection application 406 to store personal data or personal information in the cloud storage 404 associated with the privacy protection application 406 or in a cloud storage specified by the user, rather than in a server associated with the third party service. The cloud storage 404 includes, but is not limited to, Ding Drive developed by Ant Financial Cooperation or the Ali cloud storage developed by Alibaba Group. In addition, the user 402 can also store the personal data on a local client.

The user 402 is given the absolute control over the personal information or personal data stored in the cloud storage 404, i.e., the user 402 can add, search for, modify, and delete any personal information or data. The control of the user over the personal data is achieved at least partially using a password or a cipher code; furthermore, none of the privacy protection application 406, the third-party service 408, or the cloud storage 404 can acquire the password information. The user 402 can encrypt the user data stored in the cloud storage 404, so as to prevent any unauthorized use or sharing.

When the third party service 408, namely the service provided by a third party merchant or an enterprise, requests the user data, the third party service 408 transmits a request for user data of a user to the privacy protection application 406; the request for the user data includes an indication indicating what user data the third party service 408 requests. After the request for the user data is received from the third-party service 408, the privacy protection application 406 forwards the request to the user 402 or a local client. The user 402 authorizes or permits the request using a password or cipher code of the user 402, or approves the request by other means, so as to allow the third party service 408 to search for the personal information or the personal data stored in the cloud storage 404 or in the local client. After the user authorizes the request, the privacy protection application 406 installed on the client transmits authorization information to the third party service 408, acquires corresponding user data from the cloud storage 404 under the authorization of the user, and stores the user data in a (volatile) internal storage of the personal computing device of the user, rather than caches the data. The privacy protection application 406 uses the public key provided by the third party service 408 to encrypt the user data, and transmits the encrypted user data to the third party service 408. The third-party service 408 receives the encrypted user data and uses a private key to decrypt the encrypted user data and acquire the user data or information.

Figure 5:
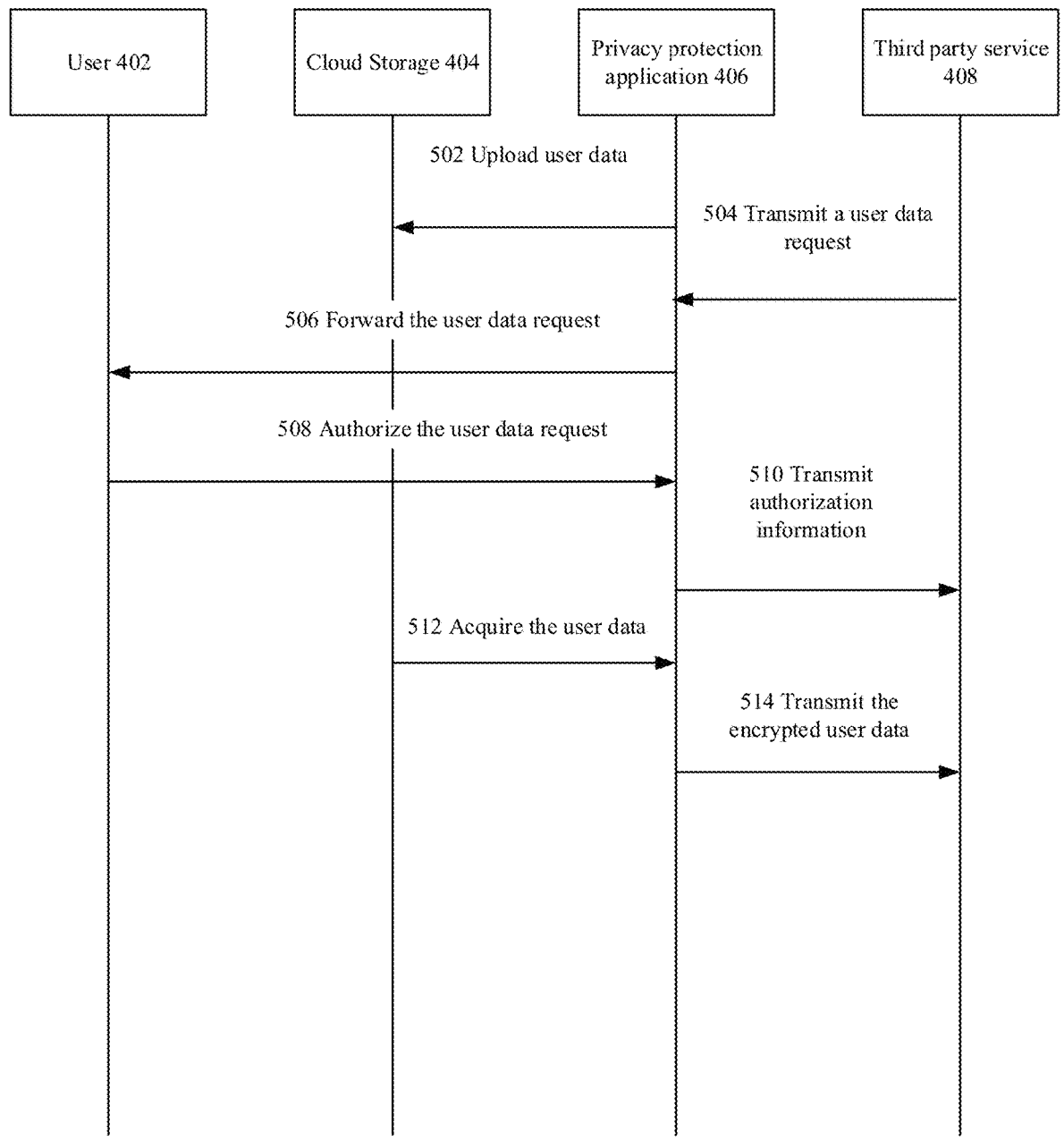
FIG. 5 is a flow chart of an example method for protecting privacy data according to one embodiment of this specification.

FIG. 5 shows a flow chart of an example system for protecting privacy data according to one embodiment of this specification.

In 502, a user uses a privacy protection application 406 to store personal data or personal information in a cloud storage 404 associated with the privacy protection application 406 or in a cloud storage specified by the user, and not a server associated with a third party service, so as to prevent the third party service from abusing user data.

In 504, when a third-party service 408 requests the user data, the third-party service 408 transmits a request for the user data to the privacy protection application 406. The request indicates what the user data the third-party service 408 requests.

In 506, after the request for the user data is received from the third-party service 408, the privacy protection application 406 forwards the request to the user 402 or a local client of the user 402. The forwarding operation can be a notification form but is not limited thereto.

In 508, the user 402 authorizes or permits the request for the user data using a password or a cipher code through the privacy protection application 406, or approves the data request by other means, so as to allow the third party service 408 to search for the personal information or the personal data stored in the cloud storage 404 or in the local client. The password owned by the user may be in a form including, but not limited to, numbers, letters, or a combination of numbers and letters; and none of the privacy protection application 406, the third party service 408, or the cloud storage 404 can acquire the password information.

In 510, after the user authorizes the request, the privacy protection application 406 transmits authorization information to the third-party service 408 to confirm that the user authorizes the data request.

In 512, on the basis of the user data that the third party service requests indicated in the request for the user data transmitted by the third party service 408, the privacy protection application 406 acquires corresponding user data from the cloud storage 404 under the authorization of the user, and encrypts the user data. Additionally or alternatively, the user data acquired by the privacy protection application from the cloud storage can be encrypted; and the privacy protection application can acquire the encrypted user data from the cloud storage under download authorization of the user, and restore the user data on the basis of the download authorization of the user.

Then, in 514, the encrypted user data is transmitted to the third-party service 408. The encryption operation can be completed using a third-party public key associated with the third-party service 408.

Then, the third-party service 408 can receive the encrypted user data, and decrypts and acquires corresponding user data.

Figure 6:
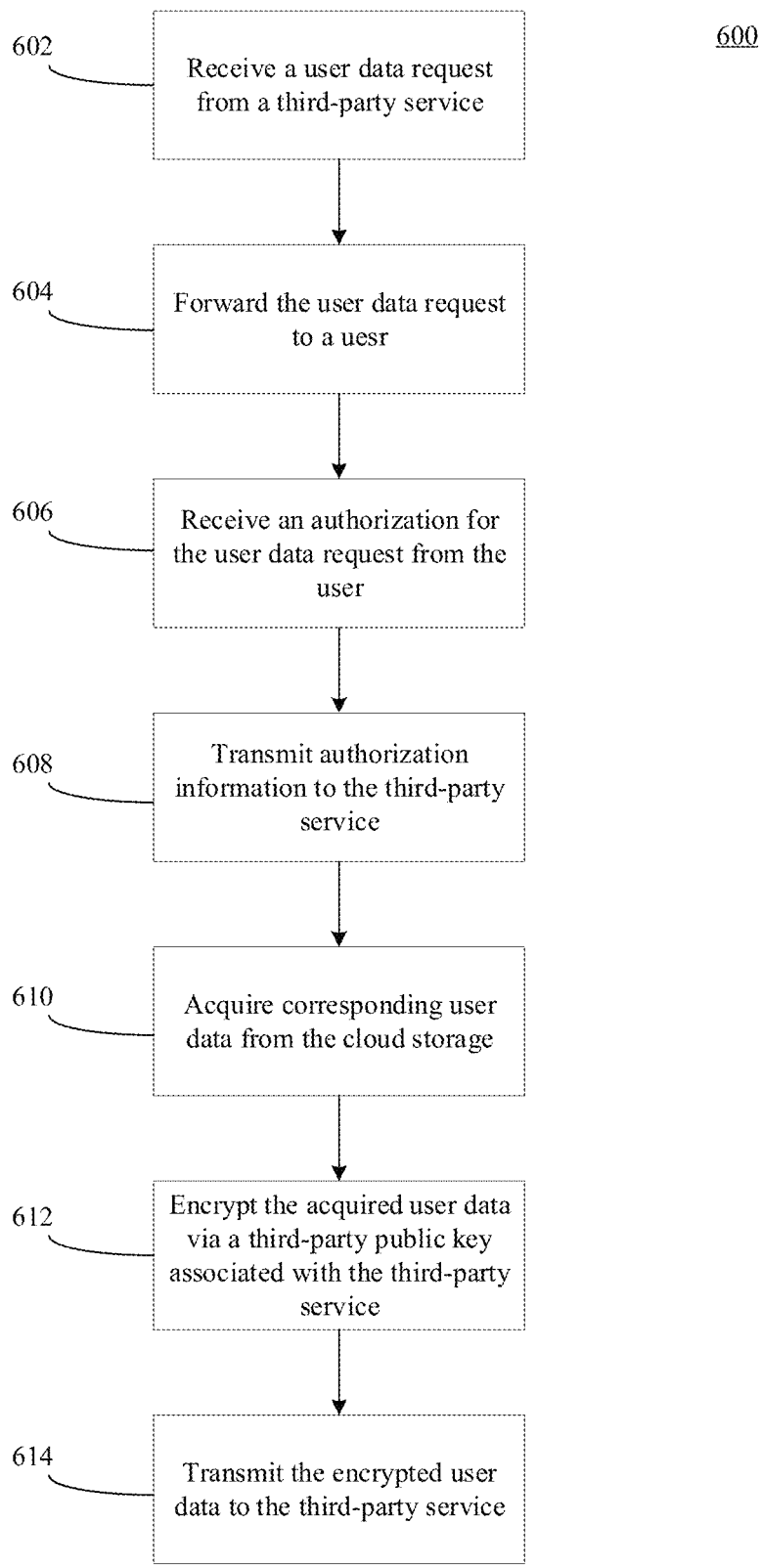
FIG. 6 shows a flow chart of an exemplary method for protecting privacy data according to one embodiment of this specification.

FIG. 6 shows a flow chart of an exemplary method 600 for protecting privacy data according to one embodiment of this specification.

In block 602, a privacy protection application installed on a local client of a user receives a request for user data of a user from a third-party service, wherein the request for the user data indicates what user data the third-party service requests.

In block 604, the privacy protection application forwards the request to the user or the local client thereof. The forwarding operation can be in a notification form but is not limited there to.

In block 606, the privacy protection application receives an authorization for the request for the user data from the user using a password, wherein the password owned by the user may be in a form, including, but not limited to, numbers, letters, or a combination of numbers and letters; and none of the privacy protection application, the third party service, or the cloud storage can acquire the password information.

In block 608, the privacy protection application transmits authorization information to the third-party service to confirm that the user authorizes the data request.

In block 610, on the basis of the indication of what user data the third party service requests in the request for the user data transmitted by the third party service, the privacy protection application acquires corresponding user data from the cloud storage under the authorization of the user. Additionally or alternatively, the user data acquired by the privacy protection application from the cloud storage can be encrypted; and the privacy protection application can acquire the encrypted user data from the cloud storage under download authorization of the user, and restore the user data on the basis of the download authorization of the user.

In block 612, the privacy protection application encrypts the acquired user data using a third-party public key associated with the third-party service.

In block 614, the privacy protection application transmits the encrypted user data to the third-party service for decrypting the encrypted user data to obtain the corresponding user data.

Figure 7:
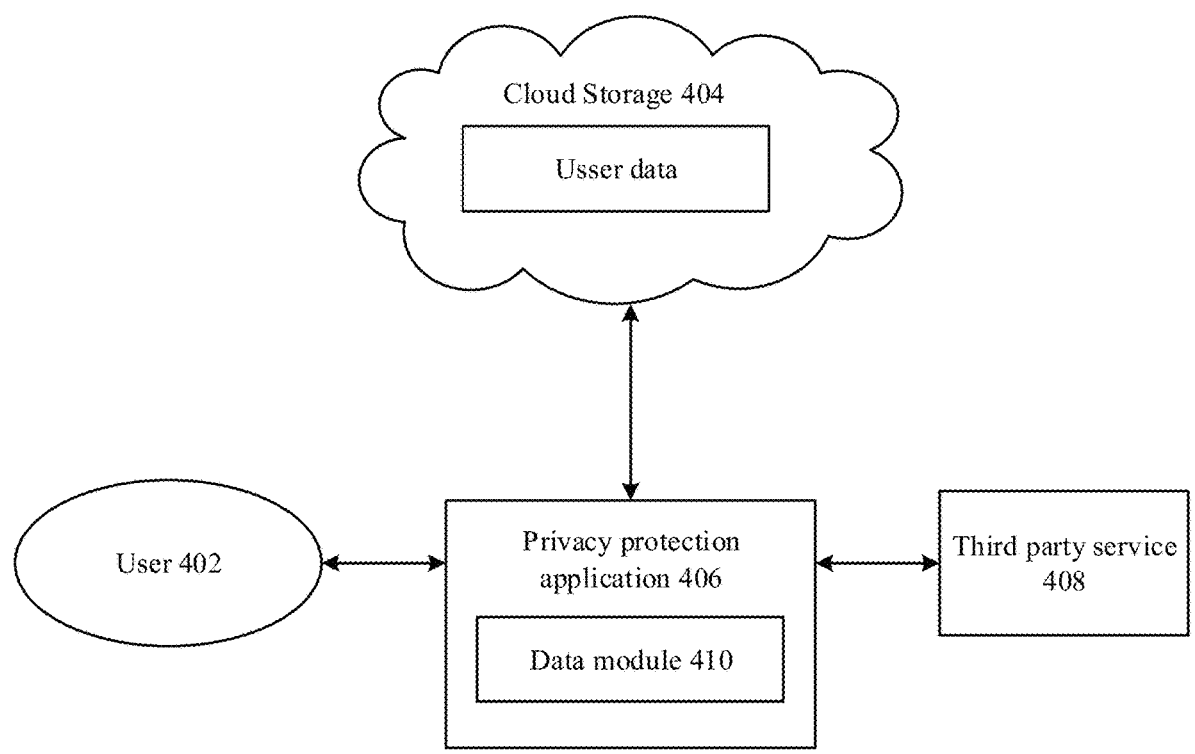
FIG. 7 shows a block diagram of another example system for protecting user privacy data according to another embodiment of this specification.

FIG. 7 shows a block diagram of another example of protecting user privacy data according to another embodiment of this specification.

In the example, a user 402 installs a privacy protection application (App) 406 to a local client for managing personal data or personal information. The privacy protection application 406 comprises a data model 410 provided by a third party service 408; the data model 410 is configured to further process user data acquired from a cloud storage 404, such that the processed user data is available but invisible to the third party service 408. Alternatively, the privacy protection application 406 comprises a rule (not shown in the figure) provided by the third-party service 408, and processes user data by using the rule, so as to generate processed data.

The privacy protection application 406 is configured to manage the personal data of the user. In one example, the privacy protection application 406 is configured to: receive a data request from the third party service 408, and forward the request to the user 402; receive an authorization or a permission of the user 402 for the request, and transmit authorization information or permission information to the third party service; and download corresponding user data from the cloud storage 404 under the authorization of the user on the basis of a data requirement indicated in the data request transmitted by the third party service 408, and store the user data in an internal storage of a personal computing device of the user, rather than cache the data. Additionally or alternatively, the user data downloaded by the privacy protection application from the cloud storage can be encrypted; and the privacy protection application can acquire the encrypted user data from the cloud storage under download authorization of the user, restore the user data on the basis of the download authorization of the user, process the restored user data downloaded from the cloud storage 404 according to a user searching rule or the data model 410 provided by the third party service 408, encrypt the processed user data, and transmit the encrypted processed user data to the third party service for decrypting and using the user data.

The user 402 stores the personal data or personal information in the cloud storage 404 associated with the privacy protection application 406 or in a cloud storage specified by the user, rather than a server associated with the third-party service. The cloud storage 404 includes, but is not limited to, Ding Drive developed by Ant Financial Cooperation and the Ali cloud storage developed by Alibaba Group. In addition, the user 402 can also store the personal data on a local client.

The user 402 is given the absolute control over the personal information or personal data stored in the cloud storage 404, i.e., the user 402 can add, search for, modify, and delete any personal information or data. The control of the user over the personal data is achieved at least partially using a password or a cipher code. Furthermore, none of the privacy protection application 406, the third-party service 408, or the cloud storage 404 can acquire the password information. Additionally, or alternatively, the user can encrypt the user data stored in the cloud storage 404, so as to prevent any unauthorized use or sharing.

When the third party service 408, namely the service provided by a third party merchant or an enterprise, requires the user data, the third party service 408 transmits a request for the user data to the privacy protection application 406; the request for the user data indicates what user data the third party service 408 requests. After the request for the user data is received from the third-party service 408, the privacy protection application 406 forwards the request to the user 402 or a local client thereof. The user 402 authorizes or permits the request using a password or a cipher code of the user 402, or approves the request by other means, so as to allow the third party service 408 to search for the personal information or the personal data stored in the cloud storage 404 or in the local client. After the user authorizes the request, the privacy protection application 406 installed on the client transmits authorization information to the third party service 408, acquires corresponding encrypted user data from the cloud storage 404 under the authorization of the user, and stores the user data in an internal storage of a personal computing device of the user, rather than caches the data. Additionally or alternatively, the user data acquired by the privacy protection application 406 from the cloud storage 404 can be encrypted; and the privacy protection application 406 can acquire the encrypted user data from the cloud storage 404 under download authorization of the user, and store the user data on the basis of the download authorization of the user. Afterwards, the privacy protection application 406 further processes the user data downloaded from the cloud storage 404 according to the data searching rule or the data model 410 received from the third party service 408, so as to generate processed user data, use a public key provided by the third party service 408 to encrypt the user data, and transmit the encrypted user data to the third party service 408. The third-party service 408 receives the encrypted user data and uses a private key to decrypt and acquire the processed user data or information.

In one embodiment of this specification, the data model 410 provided by the third-party service 408 uses logistic regression to perform binary classification on the user data. In one example, the data model uses the user data (such as age, income, and occupation of the user) acquired from the cloud storage 404 as input, calculates a corresponding result (such as whether a credit is high enough) on the basis of the data, and then returns the result, not the user data itself, to the third party service as processed data. Alternatively, when receiving the data searching rule (such as whether the user's age is in the range of from 20 to 30 years old) from the third party service 408, the privacy protection application obtains a determination result on the basis of the searching rule, i.e., yes or no, and returns the result to the third party service as processed data. Therefore, the privacy protection application 406 enables the third party service 408 to acquire the processed user data, the determination result of whether the user's age is in the range of from 20 to 30, but not the actual age of the user. The user data is therefore available but invisible to the third party service. User privacy is further protected, and privacy of the user data is further secured.

In another embodiment of this specification, a logistic regression model used in the data model 410 can be integrated with a gradient boosting decision tree (GBDT) and the Newton method to further improve efficiency and performance of the classification.

Figure 8:
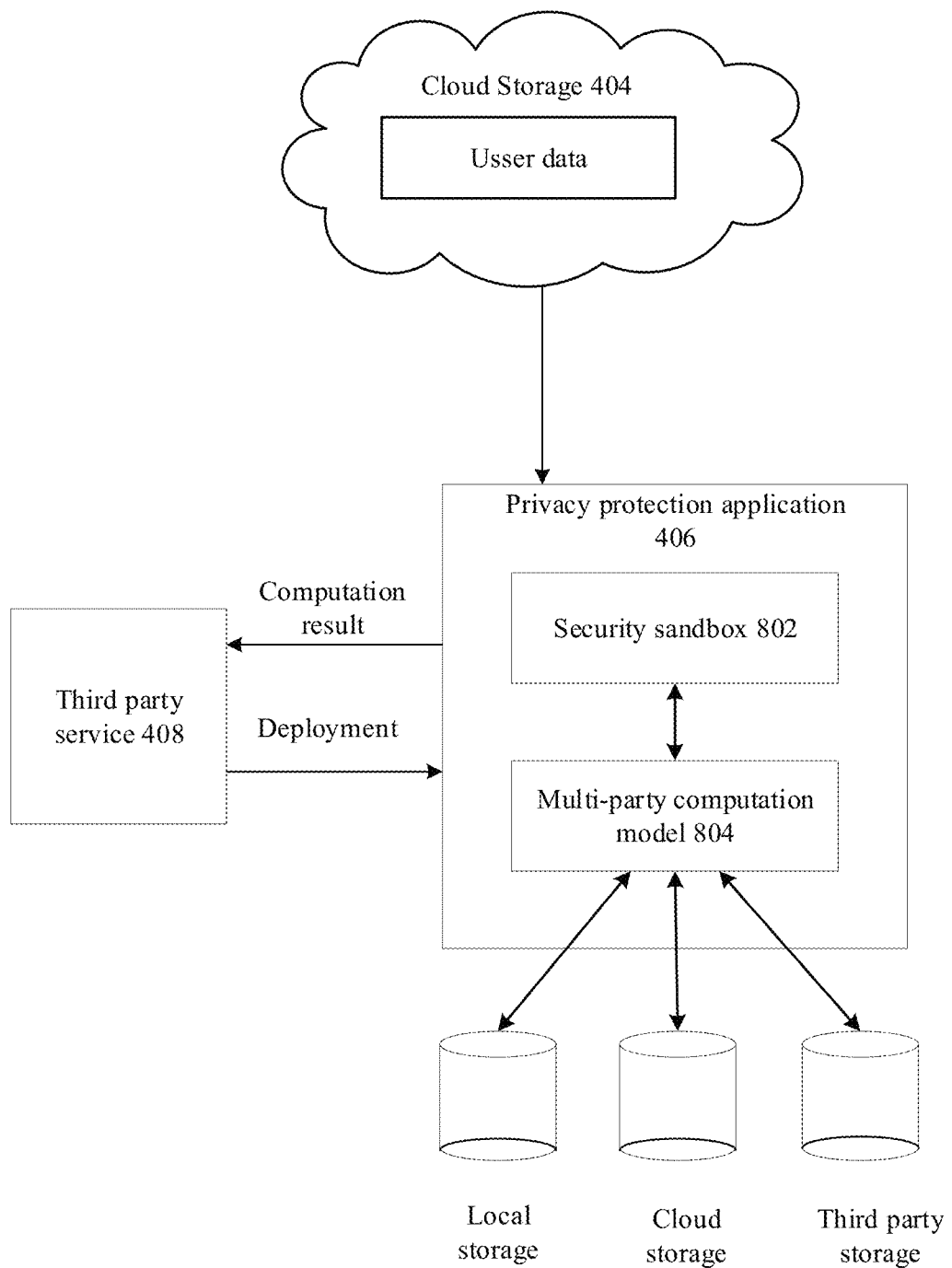
FIG. 8 shows a block diagram of a secure multi-party computation according to one embodiment of this specification.

FIG. 8 shows a block diagram of secure multi-party computation according to one embodiment of this specification.

In the embodiment of this specification, a privacy protection application 406 comprise a security sandbox 802. A third party service 408 provides a multi-party computation model 804 to the privacy protection application 406, so as to perform, in the security sandbox 802, a secure multi-party computation (MPC) on user data acquired from a cloud storage 404; the computed data would thus be available but invisible to the third party service 408.

In one example, the privacy protection application 406 can distribute the user data acquired from the cloud storage to a plurality of places using the multi-party computation model. In one embodiment of this specification, the privacy protection application can distribute the acquired user data to a cloud storage, a local storage, and a third-party storage. For example, the cloud storage can be the cloud storage 404 mentioned above; the local storage can be the user device in which the privacy protection application 406 is located; and the third-party storage can be any storage place or facility for storing data. As can be understood by those skilled in the art, the above-described places or facilities for storing the user data are exemplary only, but not limiting.

In one embodiment of this specification, the privacy protection application 406 can classify the acquired user data. As an example, but not a limitation, the user data can be classified into demographic data, asset data, and vehicle data. Then, the privacy protection application 406 can use the multi-party computation model to respectively store the three types of data to the cloud storage, the local storage, and the third-party storage mentioned above. In one embodiment of this specification, the privacy protection application 406 can store the user asset data, which is more sensitive to a securer storage, for example, the cloud storage. However, the scope of this specification is not limited thereto; instead, the privacy protection application 406 can execute specific data distributions according to corresponding privacy policies. Therefore, the risk of leaking the user data, especially sensitive data, is reduced by distributing the user data to different storage places or different storage facilities.

In another embodiment of this specification, in order to achieve higher level security and higher level user privacy protection, the privacy protection application 406 can split each type of the user data (for example, value splitting) after the user data is classified, and then respectively stores the split user data of the same type to different storage places or different storage facilities.

As an example but not a limitation, after classifying the acquired user data into demographic data, asset data, and vehicle data, the privacy protection application 406 splits the most sensitive user asset data into three portions; for example, the privacy protection application 406 splits the deposit data "2 million" of the user into three portions: 1 million, 0.45 million and 0.55 million, and respectively stores the three portions of the deposit data in the cloud storage, the local storage, and the third party storage (the three storage facilities are exemplary only, but not limiting). Other types of user data can also be split in a similar manner; therefore, each storage place or storage facility may store incomplete user data of different types, instead of complete user data of the same type. Thus, the complete user data could not be acquired from any individual storage facility, thereby further improving the user privacy protection level of the privacy protection application 406.

As can be understood by those skilled in the art, any user data can be classified into any number of portions according to different user privacy policies; and different portions of the user data can be stored to different storage places or different facilities. Moreover, the user data stored at each storage place or each storage facility may be encrypted and, when used, is in a security sandbox environment.

After the distributed storage of the data is completed, the privacy protection application 406 performs secure computation using the multi-party computation model according to a corresponding rule, wherein the secure computation is executed in the sandbox environment. In one embodiment of this specification, as an example but not a limitation, the multi-party computation model can be a logistic regression (LR) model. In the embodiment, the third-party service can supply a data searching or computation rule to the privacy protection application 406.

The data computation rule can grade different types of user data. For example, for a deposit of 0-0.1 million dollars, a score of 1 is given; for 0.1-0.5 million dollars, a score of 2 is given; for 0.5-1 million dollars, a score of 3 is given; for 1-2 million dollars, a score of 4 is given; and for more than 2 million dollars, a score of 5 is given. In a similar way, the data computation rule can grade different types of house property; for example, for house property value less than 1 million dollars, a score of 1 is given; for 1-3 million dollars, a score of 2 is given; for 3-5 million dollars, a score of 3 is given; for 5-8 million dollars, a score of 4 is given; and for more than 8 million dollars, a score of 5 is given. The data computation rule can also grade demographic data of the user; for example, for less than 10 years old, a score of 1 is given; for 10-18 years old, a score of 2 is given; for 18-25 years old, a score of 3 is given; for 25-35 years old, a score of 4 is given; and for older than 35 years old, a score of 5 is given. As can be understood by those skilled in the art, the data computation rule can set different grading standards according to a corresponding service requirement of the third party service 408; and the scope of this specification is not limited to any specific grading standard or score value.

Then, the privacy protection application 406 acquires corresponding data from corresponding data storage places or facilities according to a corresponding searching request provided by the third party service 408, and uses the logistic regression model to calculate a result satisfying the requirement of the third party service 408 on the basis of the data searching or computation rule provided by the third party service 408.

As an example but not a limitation, if the third party service 408 needs to know credit qualification of the user, the third party service provides a corresponding data searching request for the privacy protection application according to a service rule; the searching request can indicate that the user's deposit, house property value, monthly income, and age are to be graded, and score values are to be returned.

The privacy protection application acquires corresponding encrypted user data according to the received data searching request and performs secure computation on the acquired user data in the security sandbox environment using the multi-party computation model (for example, the logistic regression model). Afterwards, the privacy protection application encrypts and transmits the computed result to the third-party application. The third-party application receives and decrypts the data and acquires a desired result. As an example, but not a limitation, the result can be a total score computed on the basis of the provided data searching or computation rule. The third-party application determines credit qualification and corresponding credit line of the user on the basis of the result. Therefore, the objective of enabling sensitive data to be available but invisible to the third-party application is achieved using the privacy protection application on the basis of the secure multi-party computation.

Figure 9:
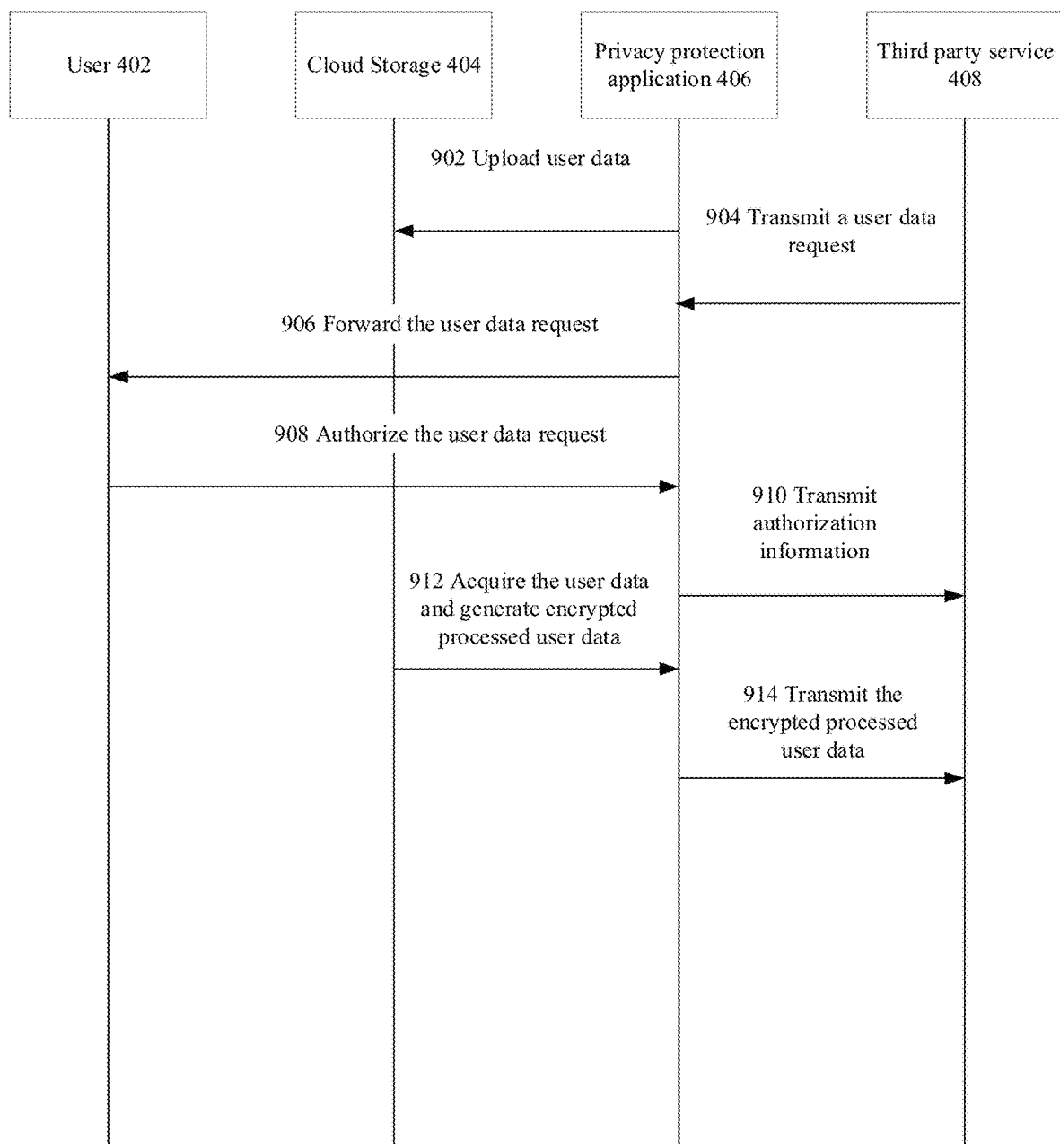
FIG. 9 is a flow chart of another example method for protecting privacy data according to another embodiment of this specification.

FIG. 9 shows a data flow chart of another example of protecting privacy data according to another embodiment of this specification.

In 902, a user uses a privacy protection application 406 to store personal data or personal information in a cloud storage 404 associated with the privacy protection application 406 or in a cloud storage specified by the user, rather than a server associated with a third party service, so as to prevent the third party service from abusing user data. In addition, the user can encrypt the user data stored in the cloud storage 404, so as to prevent any unauthorized use or sharing.

In 904, when a third-party service 408 requests the user data, the third-party service 408 transmits a request for the user data to the privacy protection application 406. The request for the user data indicates what data the third-party service requests.

In 906, after the request for the user data is received from the third-party service 408, the privacy protection application 406 forwards the request to the user 402 or a local client thereof. The forwarding operation can be a notification form but is not limited thereto.

In 908, the user 402 authorizes or permits the request for the user data using a password or a cipher code through the privacy protection application 406, or approves the request by other means, so as to allow the third party service 408 to search for the personal information or the personal data stored in the cloud storage 404 or in the local client. The password owned by the user may be in a form, including, but not limited to, numbers, letters, or a combination of numbers and letters; and none of the privacy protection application 406, the third party service 408, or the cloud storage 404 can acquire the password information.

In 910, after the user authorizes the request, the privacy protection application 406 transmits authorization information to the third-party service 408 to confirm that the user authorizes the data request.

In 912, on the basis of a data requirement indicated in the request for the user data transmitted by the third party service 408, the privacy protection application 406 acquires corresponding user data from the cloud storage 404 under the authorization of the user, further processes the acquired user data on the basis of a data model or a data searching rule received from the third party service, so as to generate processed user data; and the privacy protection application 406 uses a public key provided by the third party service 408 to encrypt the processed user data.

In one example, the third-party service 408 can provide a multi-party computation model to the privacy protection application 406, and performs the computation based on the multi-party computation model in a security sandbox of the privacy protection application. The secure computation comprises: computing a result using the data model, for example a logistic regression model, on the basis of the searching rule provided by the third party service 408 and the user data provided by the privacy protection application; and transmitting the result to the third party service, such that the user data is available but invisible to the third party service. The user data provided by the privacy protection application can be classified and stored to different data storage facilities based on types, thus reducing the risk of leaking the user data. In another embodiment of this specification, the same type of user data can be split, and then stored to different data storage facilities, such that none of the storage facilities would know the complete user data, thus the privacy protection level or grade of the user data is further protected.

Additionally or alternatively, the user data acquired by the privacy protection application from the cloud storage can be encrypted; and the privacy protection application can acquire the encrypted user data from the cloud storage under download authorization of the user, and restore the user data on the basis of the download authorization of the user.

Afterwards, in block 914, the privacy protection application 406 transmits the encrypted processed user data to the third-party service 408. Then, the third party service 408 receives the encrypted processed user data, uses a private key to decrypt the user data, so as to acquire the processed user data; and the third party service 408 can then acquire desired information by using the data model or the data searching rule provided previously.

Figure 10:
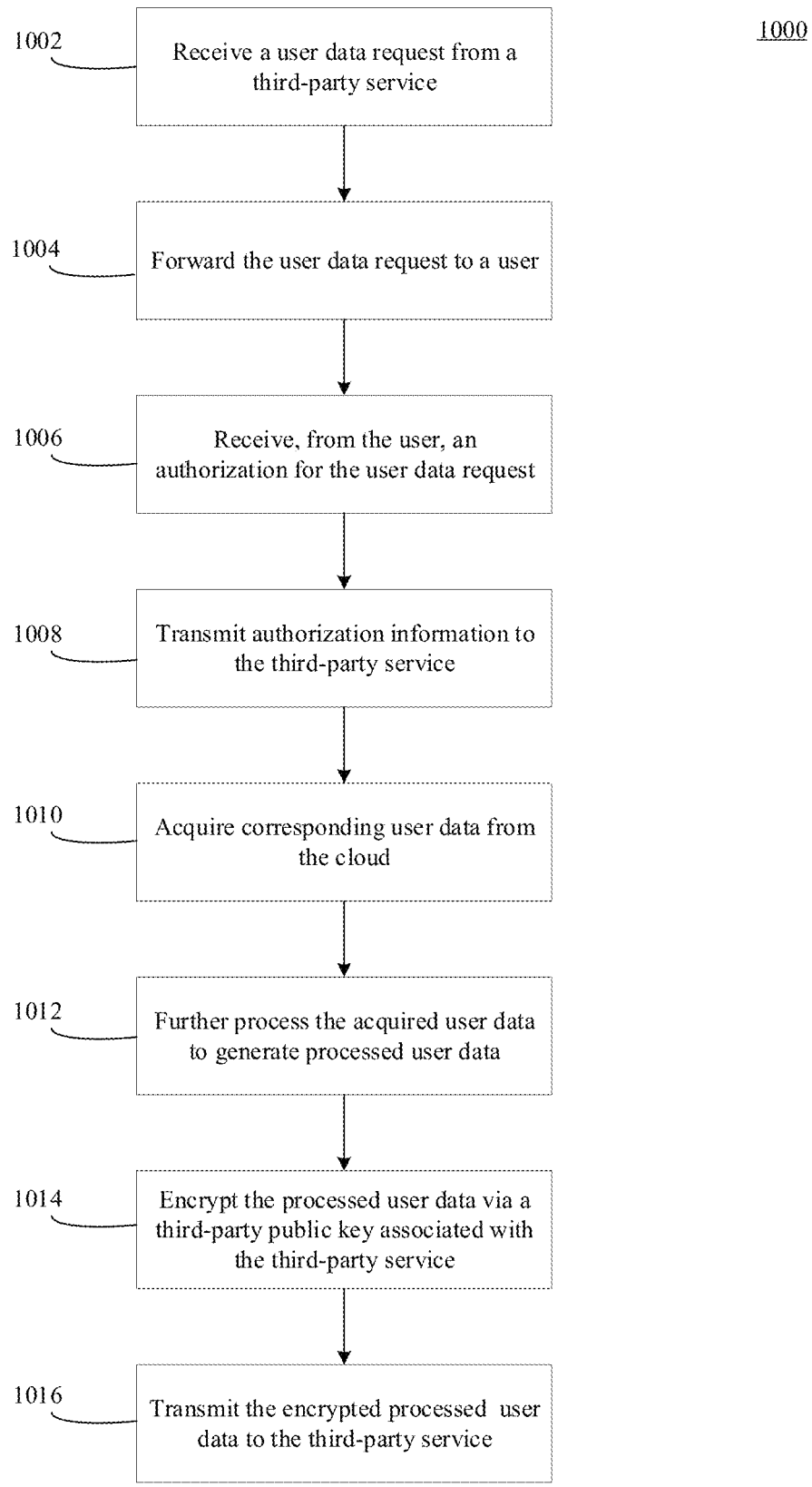
FIG. 10 is a flow chart of another exemplary method for protecting privacy data according to another embodiment of this specification.

FIG. 10 shows a flow chart of another exemplary method 1000 for protecting privacy data according to another embodiment of this specification.

In block 1002, a privacy protection application installed on a local client of a user receives a request for the user data from a third-party service, wherein the request for the user data indicates what data the third-party service requests.

In block 1004, the privacy protection application forwards the request to the user or the local client thereof. The forwarding operation can be a notification form but is not limited thereto.

In block 1006, the privacy protection application receives an authorization of the user for the request for the user data using a password; the password owned by the user may be in a form, including, but not limited to, numbers, letters, or a combination of numbers and letters; and none of the privacy protection application, the third party service, or the cloud storage can acquire the password information.

In block 1008, the privacy protection application transmits authorization information to the third-party service to confirm that the user authorizes the data request.

In block 1010, on the basis of a data requirement indicated in the request for the user data transmitted by the third-party service, the privacy protection application acquires corresponding user data from the cloud storage under the authorization of the user. Additionally or alternatively, the user data acquired by the privacy protection application from the cloud storage can be encrypted; and the privacy protection application can acquire the encrypted user data from the cloud storage under download authorization of the user, and restore the user data on the basis of the download authorization of the user.

In block 1012, the privacy protection application further processes the acquired user data on the basis of a user data searching rule or a data model provided by the third-party service, so as to generate processed user data.

In block 1014, the privacy protection application encrypts the processed user data using a third-party public key associated with the third-party service.

In block 1016, the privacy protection application transmits the encrypted processed user data to the third-party service for decrypting and acquiring the processed user data.

The embodiments of this specification are described above with reference to the block diagrams and/or operation description of the methods, systems and computer program products according to the embodiments of this specification. The functions/actions indicated in the blocks can be rearranged in an order different from that shown in any flow chart. For example, depending on the involved function/action, two blocks shown sequentially can be actually executed at the same time, or sometimes can also be executed in a reverse order.

The above-described descriptions, examples, and data provide an overall description for the manufacturing and using of the components of this specification. Many embodiments of this specification can be made without departing from the spirit and scope of this specification; therefore, this specification falls within the scope of the attached claims.

The invention claimed is:

1. A method, comprising:
classifying, by a processor, user data of a user into different classes, and
splitting, by the processor, user data of a same class into pieces of split user data and storing the pieces of split user data at a plurality of different storage facilities;
receiving, by the processor from a third-party service, (i) a request for a user data value derived based on the user data and (ii) a data model configured to calculate the user data value from the user data;
receiving, by the processor from the user, an authorization for retrieving the user data;
acquiring, by the processor, the user data from the plurality of different storage facilities;
generating, by the processor, the user data value by processing the acquired user data with the data model provided by the third party service, wherein the user data value is derived from a plurality of different classes of the user data without revealing the user data;
encrypting, by the processor, the user data value using a third-party public key associated with the third-party service to generate an encrypted user data value; and
transmitting, by the processor, the encrypted user data value to the third-party service to enable the third-party service to decrypt the encrypted user data value to obtain the user data value.

2. The method according to claim 1, wherein after the user data is acquired, the user data is stored in an internal storage of a personal computing device of the user.

3. The method according to claim 1, wherein the authorization is based on a password of the user, wherein the password is not accessible to the third-party service and the plurality of different storage facilities.

4. The method according to claim 1, further comprising uploading the user data to a cloud storage, wherein the user is allowed to encrypt, add, search for, modify, and delete any user data in the cloud storage.

5. The method according to claim 1, wherein the data model uses logistic regression to generate the user data value.

6. The method according to claim 1, wherein the user data value is generated with the data model in a security sandbox.

7. The method according to claim 1, further comprises:
encrypting the pieces of split user data and storing the encrypted pieces of split user data at the plurality of different storage facilities.

8. An apparatus comprising:
at least one processor; and
a memory communicatively connected to the at least one processor, wherein the memory stores instructions executable by the at least one processor to cause the at least one processor to perform operations including:
classifying user data of a user into different classes, and
splitting user data of a same class into pieces of split user data and storing the pieces of split user data at a plurality of different storage facilities;
receiving, from a third-party service, (i) a request for a user data value derived based on the user data and (ii) a data model configured to calculate the user data value from the user data;
receiving, from the user, an authorization for retrieving the user data;
acquiring the user data from the plurality of different storage facilities;
generating the user data value by processing the acquired user data with a data model provided by the third party service, wherein the user data value is derived from a plurality of different classes of the user data without revealing the user data;
encrypting the user data value using a third-party public key associated with the third-party service to generate an encrypted user data value; and
transmitting the encrypted user data value to the third-party service to enable the third-party service to decrypt the encrypted user data value to obtain the user data value.

9. The apparatus according to claim 8, wherein after the user data is acquired, the user data is stored in an internal storage of a personal computing device of the user.

10. The apparatus according to claim 8, wherein the authorization is based on a password of the user, wherein the password is not accessible to the third-party service and the plurality of different storage facilities.

11. The apparatus according to claim 8, wherein the instructions further cause the at least one processor to perform:
uploading the user data to a cloud storage, wherein the user is allowed to encrypt, add, search for, modify, and delete any user data in the cloud storage.

12. The apparatus according to claim 8, wherein the data model uses logistic regression to generate the user data value.

13. The apparatus according to claim 8, wherein the instructions further cause the at least one processor to perform:
generating the user data value with the data model in a security sandbox.

14. The apparatus according to claim 8, wherein the instructions further cause the at least one processor to perform:
encrypting the pieces of split user data and storing the encrypted pieces of split user data at the plurality of different storage facilities.

15. A non-transitory computer-readable storage medium storing instructions executable by at least one processor to cause the at least one processor to perform operations including:
classifying user data of a user into different classes, and splitting user data of a same class into pieces of split user data and storing the pieces of split user data at a plurality of different storage facilities;

receiving, from a third-party service, (i) a request for a user data value derived based on the user data and (ii) a data model configured to calculate the user data value from the user data;

receiving, from the user, an authorization for retrieving the user data;

acquiring the user data from the plurality of different storage facilities;

generating the user data value by processing the acquired user data with a data model provided by the third party service, wherein the user data value is derived from a plurality of different classes of the user data without revealing the user data;

encrypting the user data value using a third-party public key associated with the third-party service to generate an encrypted user data value; and transmitting the encrypted user data value to the third-party service to enable the third-party service to decrypt the encrypted user data value to obtain the user data value.

16. The non-transitory computer-readable storage medium according to claim 15, wherein after the user data is acquired, the user data is stored in an internal storage of a personal computing device of the user.

17. The non-transitory computer-readable storage medium according to claim 15, wherein the authorization is based on a password of the user, wherein the password is not accessible to the third-party service and the plurality of different storage facilities.

18. The non-transitory computer-readable storage medium according to claim 15, wherein the instructions further cause the processor to perform:
uploading the user data to a cloud storage, wherein the user is allowed to encrypt, add, search for, modify, and delete any user data in the cloud storage.

19. The non-transitory computer-readable storage medium according to claim 15, wherein the data model uses logistic regression to generate user data value.

20. The non-transitory computer-readable storage medium according to claim 15, wherein the instructions further cause the at least one processor to perform:
encrypting the pieces of split user data and storing the encrypted pieces of split user data at the plurality of different storage facilities.

* * * * *